(12) United States Patent
Wei

(10) Patent No.: US 11,194,116 B2
(45) Date of Patent: Dec. 7, 2021

(54) LENS MODULE

(71) Applicant: AAC Technologies Pte. Ltd., Singapore (SG)

(72) Inventor: Chuandong Wei, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 217 days.

(21) Appl. No.: 16/529,771

(22) Filed: Aug. 1, 2019

(65) Prior Publication Data

US 2020/0049927 A1 Feb. 13, 2020

(30) Foreign Application Priority Data

Aug. 10, 2018 (CN) .......................... 201821293131.3

(51) Int. Cl.
*G02B 7/02* (2021.01)
*G02B 27/00* (2006.01)

(52) U.S. Cl.
CPC ......... *G02B 7/021* (2013.01); *G02B 27/0018* (2013.01)

(58) Field of Classification Search
CPC .... G02B 7/021; G02B 27/0018; G02B 7/025; G02B 7/022; G02B 5/005; G02B 7/00; G02B 7/02
See application file for complete search history.

(56) References Cited

U.S. PATENT DOCUMENTS

2012/0218649 A1* 8/2012 Konishi ................... G02B 7/08
359/813

FOREIGN PATENT DOCUMENTS

JP S61107310 A * 5/1986 ............. G02B 7/022

OTHER PUBLICATIONS

Machine Translation of JPS61107310A (Year: 1986).*

* cited by examiner

*Primary Examiner* — Darryl J Collins
*Assistant Examiner* — Matthew Y Lee
(74) *Attorney, Agent, or Firm* — W&G Law Group

(57) ABSTRACT

The present disclosure provides a lens module, including a lens barrel and a lens group. The lens group including at least one lens, and the lens barrel including an inside surface and an outside surface. The lens includes an optical portion and a bearing portion. The bearing portion includes an object side, an image side, a lateral surface and an inclined surface. The inside surface includes a first abutting surface, an extend surface and a second abutting surface, the lateral surface abutting against the first abutting surface, the lateral surface is provided with a protrusion extending from the lateral surface towards the second abutting surface. The protrusion is separated from the second abutting surface. The protrusion, the lateral surface, the extend surface and the second abutting surface form a first adhesive accommodation slot, and the inclined surface, the protrusion and the second abutting surface form a second adhesive accommodation slot.

5 Claims, 4 Drawing Sheets

LENS MODULE

TECHNICAL FIELD

The present disclosure relates to the field of imaging technologies, more particular to a lens module.

BACKGROUND

With continuous development of technologies, portable electronic devices continue to develop towards intelligence and miniaturization. In addition to digital cameras, portable electronic devices such as tablet computers and mobile phones and the like are equipped with lens modules with a shooting performance, and requirements on shooting for the lens modules are also increasingly high.

In related technologies, a lens module structure of a camera in an electronic device is usually composed of an aspheric lens and an external fixed mechanical part, and then a whole lens module is composed of a light-shielding sheet, a light-shielding plate, a connecting portion, and a plug. The whole lens module structural member is fixed by dispensing adhesive at the plug. In this manner, an anchoring force for fix the lens module is insufficient, and lenses are easily loosened, resulting in imaging instability.

Therefore, it is necessary to provide a new lens module to solve the foregoing technical problems.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following descriptions are merely some embodiments of the present disclosure, and a person of ordinary skilled in the art may still derive other accompanying drawings from these accompanying drawings without creative efforts

DETAILED DESCRIPTION

The following clearly and completely the technical solutions in embodiments of the present disclosure with reference to the accompanying drawings of the embodiments of the present disclosure. Apparently, the embodiments described are merely some but not all of the embodiments of the present disclosure. All other embodiments obtained by a person of ordinary skilled in the art based on the embodiments of the present disclosure without creative efforts shall fall within the protection scope of the present disclosure.

Figure 1:
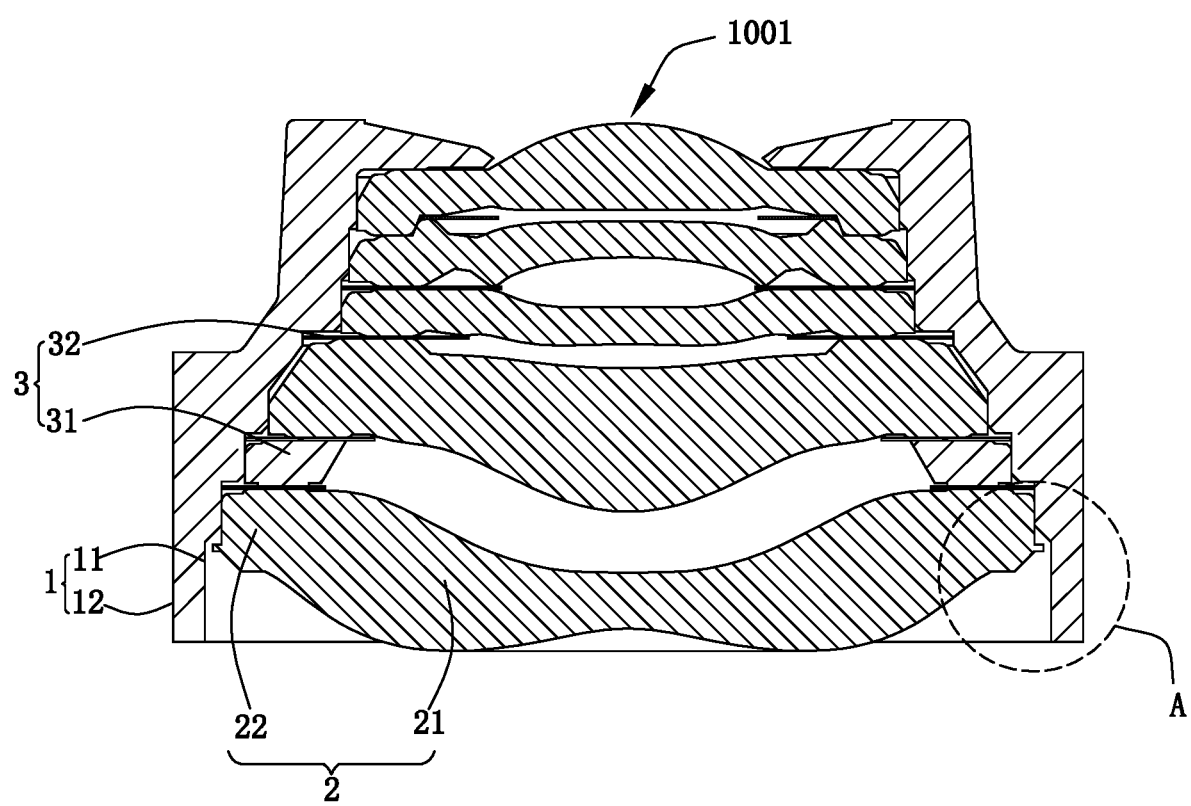
FIG. 1 is a sectional view of a first embodiment of a lens module according to the present disclosure.
Figure 2:
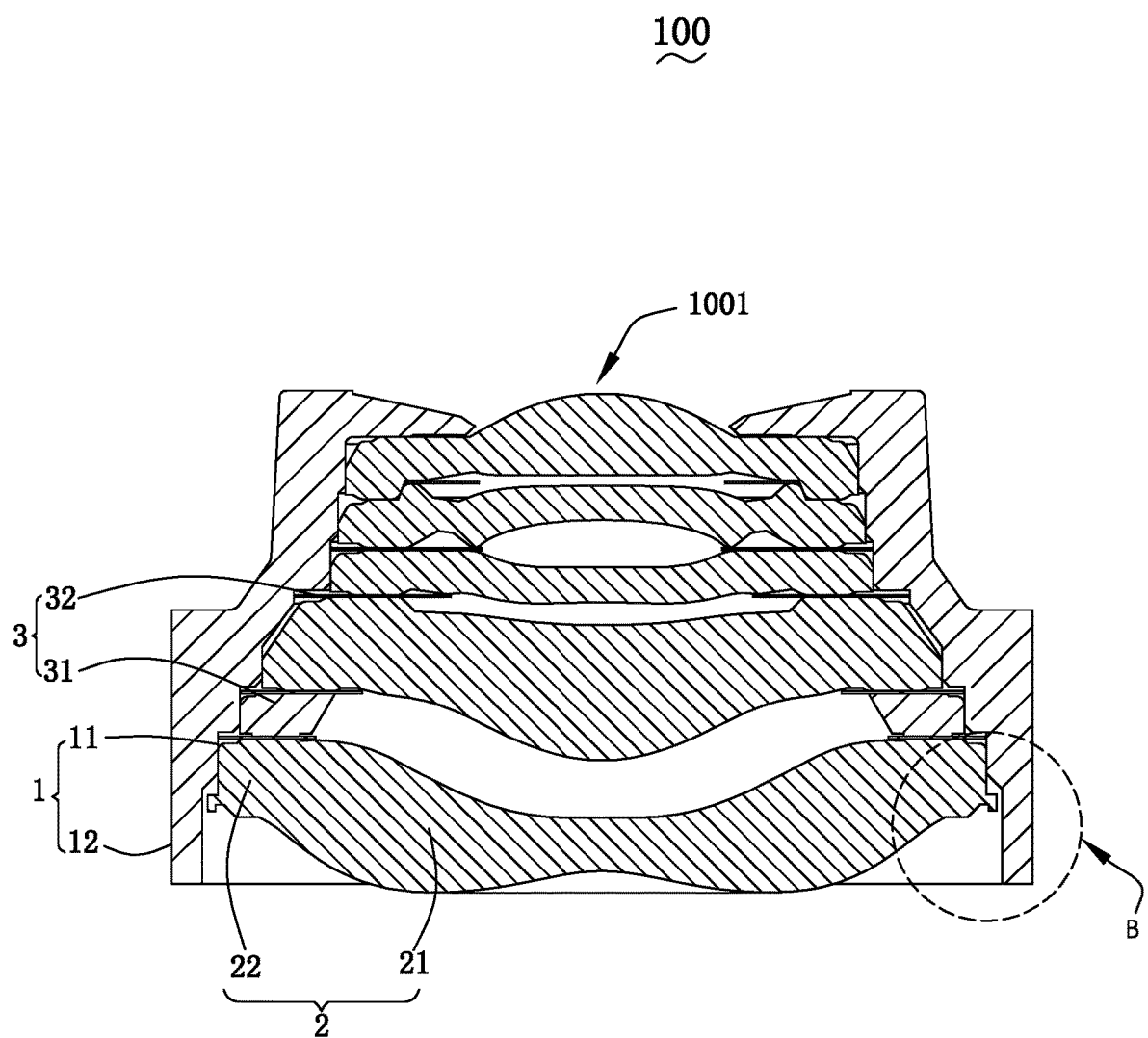
FIG. 2 is a sectional view of a second embodiment of a lens module according to the present disclosure.

Referring to FIG. 1 and FIG. 2, the lens module 100 includes a lens barrel 1, a lens 2 and a light-shielding member 3.

The lens barrel 1 is provided with an optical aperture 1001. The lens barrel 1 is configured to provide a mounting position for the lens 2. The lens barrel 1 includes an inside surface 11 abutting against the lens 2 and an outside surface 12 disposed opposite to the inside surface 11. The inside surface 11 includes a first abutting surface 111 abutting against the lens 2, an extend surface 112 bending and extending from the first abutting surface 111 away from a straight line where the optical aperture 1001 locates, and a second abutting surface 113 connected to the extend surface 112.

There are a plurality of lenses 2 which are formed by being closely arranged in order from a side of an object to an image side. Arranging the plurality of lenses 2 makes display more delicate when the lens module 100 is imaging. The lenses 2 include an optical portion 21 and a bearing portion 22 disposed around the optical portion 21. The optical portion 21 is configured for optical imaging. The bearing portion 22 is configured to support the optical portion 21.

The bearing portion 22 includes an object side 221, an image side 222 disposed opposite to the object side 221, a lateral surface 223 connecting the object side 221 and the image side 222, and an inclined surface 224 connecting the lateral surface 223 and the image side 222. The lateral surface 223 abuts against the first abutting surface 111.

Figure 3:
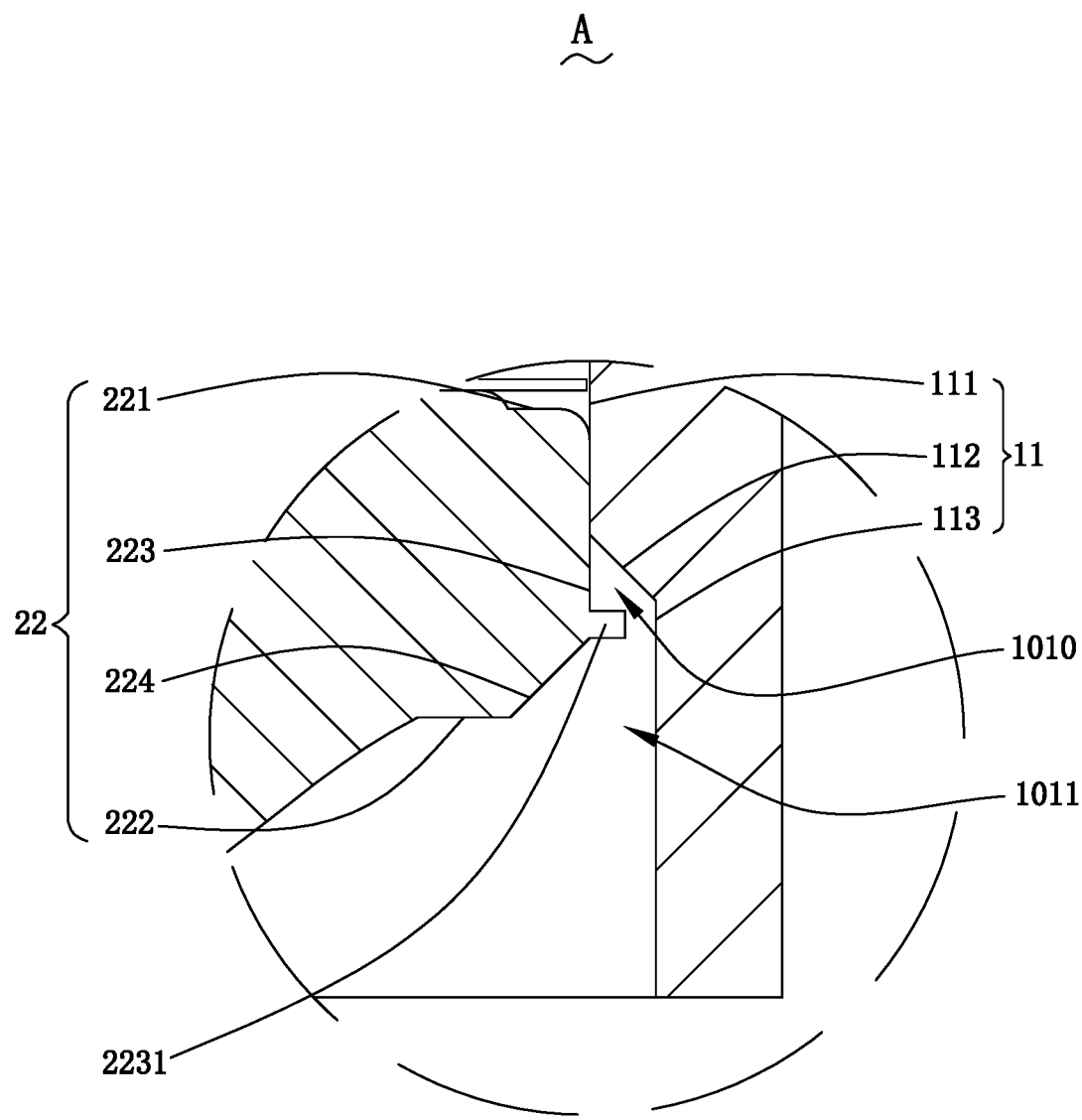
FIG. 3 is an enlarged view of an area A in FIG. 1.

With reference to FIG. 1 and FIG. 3, the lateral surface 223 is provided with a protrusion 2231 extending from the lateral surface 223 towards the second abutting surface 113, the protrusion 2231 being separated from the second abutting surface 113. The lateral surface 223, the extend surface 112 and the protrusion 2231 form a first adhesive accommodation slot 1010; and the protrusion 2231, the inclined surface 223, and the second abutting surface 113 form a second adhesive accommodation slot 1011. The first adhesive accommodation slot 1010 and the second adhesive accommodation slot 1011 are in communication with each other.

The first adhesive accommodation slot 1010 and the second adhesive accommodation slot 1011 are formed by the protrusion 2231, which increases attachment area of dispensed adhesive, so that the lenses 2 are arranged closer and the lens module 100 is more reliable.

Figure 4:
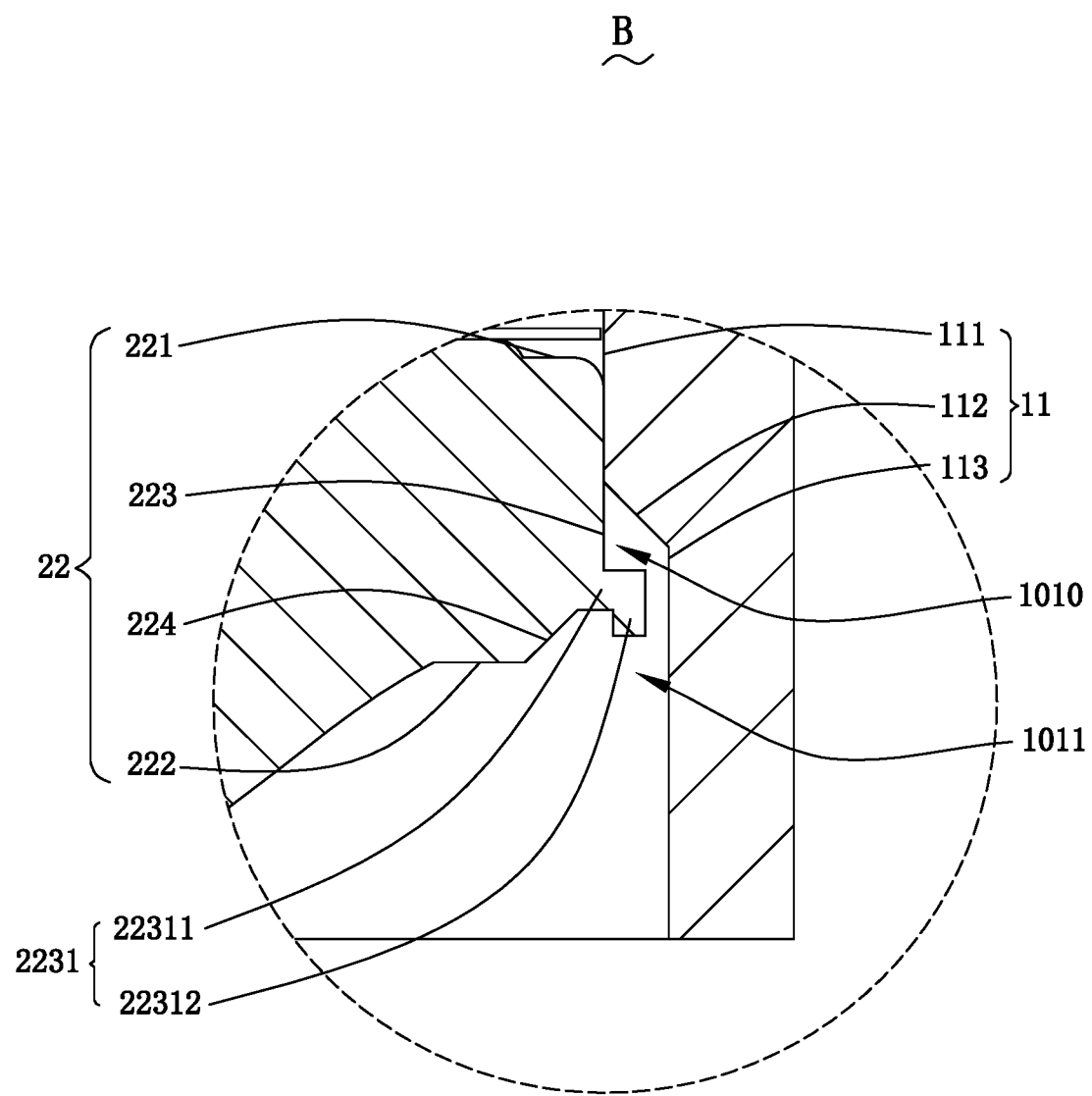
FIG. 4 is an enlarged view of an area B in FIG. 2.

With reference to FIG. 3 and FIG. 4, the protrusion 2231 is an L-shaped structure. The protrusion 2231 includes a fixing portion 22311 fixed to the lateral surface and a perpendicular portion 22312 perpendicularly extending from an end of the fixing portion 22311 away from the lateral surface toward the image side. The perpendicular portion 22312 is separated from the inside surface 11. After adhesive dispensing, the first adhesive accommodation slot 1010 and the second adhesive accommodation slot 1011 are filled with adhesive. Since the perpendicular portion 22312 extends into the second adhesive accommodation slot 1011, further increasing attachment area of adhesive, the lens module 100 is more reliable. It is natural and feasible that the perpendicular 22312 may further extend towards the first accommodation slot 1010.

The present disclosure is not limited to the above-described structure, but other structures that may increase adhesive attachment area may also be applied and fall into the protection scope of the present disclosure.

The light-shielding member 3 is a hollow annular structure, the light-shielding member 3 is bonded to the lens 2. There are a plurality of light-shielding members 3 each sandwiched between two lenses 2. The light-shielding member 3 includes a light-shielding sheet 31 and a light-shielding plate 32, and the light-shielding member 3 is configured to shield stray light, so that imaging quality of the lens module 100 is improved.

Compared with related technologies, in the lens module of the present disclosure, the bearing portion of the lens is provided with a protrusion separated from the lens barrel, and the protrusion separates an adhesive dispensing slot into two portions, thereby increasing attachment area of adhesive so that lenses are arranged closely and improving reliability of the lens module.

The foregoing descriptions are merely implementations of the present disclosure. It should be noted herein that a person of ordinary skilled in the art may further make improvements without departing from the creative concept of the present disclosure, but these all fall within the protection scope of the present disclosure.

What is claimed is:

1. A lens module, comprising a lens barrel provided with an optical aperture and a lens group disposed in the lens barrel, the lens group comprising at least one lens, and the lens barrel comprising an inside surface abutting against the lens and an outside surface disposed opposite to the inside surface, wherein the lens comprises an optical portion and a bearing portion disposed around the optical portion, the bearing portion comprises an object side facing a side of an object, an image side disposed opposite to the object side, a lateral surface connecting the object side and the image side, and an inclined surface connecting the lateral surface and the image side, the inside surface comprises a first abutting surface abutting against the lens, an extend surface bending and extending from the first abutting surface in a direction away from an optical axis and a second abutting surface connecting the extending surface, the lateral surface abutting against the first abutting surface, the lateral surface is provided with a protrusion extending from the lateral surface to the second abutting surface, the protrusion being separated from the second abutting surface, the protrusion, the lateral surface, the extend surface and the second abutting surface forming a first adhesive accommodation slot, and the inclined surface, the protrusion and the second abutting surface forming a second adhesive accommodation slot.

2. The lens module according to the claim 1, wherein the protrusion comprises a fixing portion fixed to the lateral surface, and a perpendicular portion perpendicularly extending from an end of the fixing portion away from the lateral surface toward the image side.

3. The lens module according to the claim 2, wherein the protrusion is disposed around the bearing portion.

4. The lens module according to the claim 1, wherein the lens module further comprises a light-shielding member bonded to the lens.

5. The lens module according to the claim 4, wherein the light-shielding member is a hollow annular structure.

* * * * *